United States Patent
Siol et al.

[11] Patent Number: 5,380,797
[45] Date of Patent: Jan. 10, 1995

[54] HIGH IMPACT STRENGTH POLYMER BLENDS

[75] Inventors: Werner Siol, Darmstadt; Jens-Dieter Fischer, Bickenbach; Ulrich Terbrack, Reinheim; Klaus Koralewski, Riedstadt, all of Germany

[73] Assignee: Rohm GmbH Chemische Fabrik, Darmstadt, Germany

[21] Appl. No.: 992,259

[22] Filed: Dec. 14, 1992

[30] Foreign Application Priority Data

Dec. 14, 1991 [DE] Germany .............................. 4141319

[51] Int. Cl.6 ............................................. C08L 51/04
[52] U.S. Cl. ........................................ 525/71; 525/64; 525/67
[58] Field of Search ............................. 525/71, 64, 67

[56] References Cited

U.S. PATENT DOCUMENTS

| | | | |
|---|---|---|---|
| 4,748,203 | 5/1988 | van Abeelen | 525/148 |
| 4,898,912 | 2/1990 | Siol | 525/227 |
| 4,906,699 | 3/1990 | Siol | 525/67 |

FOREIGN PATENT DOCUMENTS

| | | |
|---|---|---|
| 0113924 | 7/1984 | European Pat. Off. . |
| 0080072 | 6/1988 | European Pat. Off. . |
| 0278347 | 8/1988 | European Pat. Off. . |
| 0367052 | 5/1990 | European Pat. Off. . |
| 0370345 | 5/1990 | European Pat. Off. . |
| 0370346 | 5/1990 | European Pat. Off. . |
| 2319667 | 2/1977 | France . |
| 3329765 | 2/1985 | Germany . |
| 3743199 | 6/1989 | Germany . |
| 2056465 | 3/1981 | United Kingdom . |

*Primary Examiner*—David Buttner
*Attorney, Agent, or Firm*—Oblon, Spivak, McClelland, Maier & Neustadt

[57] ABSTRACT

This invention relates to high impact strength polymer blends containing at least two two-phase or multiphase polymers P1 and P2, which in turn contain at least one toughening phase A1 or A2 and at least one hardness phase B1 or B2. B1 and B2 differ in chemical structure and are thermodynamically compatible with one another. The polymer blend optionally contains another thermoplastic polymer B'3 and/or another two-phase or multiphase polymer P4 contain at least one toughening phase A4 and at least one hardness phase B4, provided that B'3 and/or B4 are different from B1 and B2 and are thermodynamically compatible with B1 and B2.

13 Claims, No Drawings

HIGH IMPACT STRENGTH POLYMER BLENDS

BACKGROUND OF THE INVENTION

1. Field of the Invention

The invention relates to high impact strength polymer blends that contain two two-phase or multiphase polymers P1 and P2, with the hard (matrix) phases B1 and B2 of the polymers P1 and P2 differing in their chemical structure and being compatible with one another. These polymer blends may optionally contain another thermoplastic polymer B'3 and/or another two-phase or multiphase polymer P4, with the hard phase B4 of the polymer P4 being different from B1 and B2 and compatible with B1 and B2. The polymer blends of the invention can be used as injection molding or extrusion compositions for plastic parts subjected to high stresses, for example casings, shock absorbers, or load-bearing mechanisms.

2. Discussion of the Background

The problem of converting relatively brittle plastics into industrially usable products with improved impact strength is well known.

Methods are described in detail in the literature for impact strength modification of plastics, especially thermoplastics. Thus, for example, D. Neufray and K.-H. Ott report the impact strength modification of polybutylene terephthalate, polyamides, and polycarbonates with butadiene graft polymers (Angew. Makromol. Chem., 1981, 98:213–224). Crosslinked rubber particles are anchored or coupled to the thermoplastic matrix, since otherwise no improvement of toughness is achieved even with high elastomer content. The coupling can be of physical or chemical nature, i.e., it is achieved by grafting the crosslinked rubber particles to polymers that are polymerizable by themselves into thermoplastic polymers. The number of entanglements that the grafted polymer molecules develop with the matrix polymer molecules and the thermodynamic compatibility between grafted polymer molecules and matrix polymer molecules are said to be crucial for the coupling.

In general, therefore, grafted branch polymers that are identical with the matrix polymers are chosen. For example, elastomer particles consisting of crosslinked polybutadiene or polybutyl acrylate that have PMMA grafted branches are used for the impact strength modification of polymethyl methacrylate (PMMA). See, for example, EP 0 113 924 (equivalent to U.S. Pat. No. 4,513,118), DE-OS 33 29 765 (equivalent to U.S. Pat. No. 4,521,567) and EP 0 080 072.

A distinct increase of impact strength, particularly of notched impact strength, can be produced for brittle plastics when the grafted branch polymer particles bound to the crosslinked elastic particles are different chemically from the matrix polymer, but the grafted branch polymers are thermodynamically compatible with the matrix polymers, in other words they form polymer alloys. Such impact strength modifying agents and their blends with polyvinyl chloride, polystyrene, poly-α-methylstyrene, chlorinated rubber, polycarbonate, and copolymers of methyl methacrylate and α-methylstyrene are described in DE-OS 37 43 199 (equivalent to U.S. Pat. No. 4,906,609).

Impact strength modifying agents that have grafted branches whose compatibility is specifically designed for polycarbonate are described in DE-OS 38 03 405 (equivalent to U.S. Pat. No. 4,997,883).

Polymer blends of two elastomer-modified polymers that have the same grafted branch polymers and matrix polymers but different toughness phases are described in EP-A 0 370 345 and EP-A 0 370 346. If the toughening phases have definite particle sizes, combinations with good toughening at low temperatures and good thermoplastic processability can be produced. EP-A 0 278 347 includes thermoplastic molding compositions from rubber-modified vinylaromatic polymers and polyalkylene ethers that have grafted branches of a copolymer consisting of alkyl acrylates, cycloalkyl (meth)acrylates, and optionally styrene, and show antistatic behavior.

EP-A 0 367 052 relates to rubber-modified molding compositions containing thermoplastic polyesters and a mixture of two grafted rubbers consisting of diene rubber with grafted branch copolymers of styrene, acrylonitrile, and methyl methacrylate, and acrylate rubber with the same grafted branch copolymers, which show good toughness at low temperatures.

Although a number of patents and other literature exist on the subject of "impact strength modification of thermoplastics", there is a great industrial need for impact strength modifying agents that distinctly increase the impact strength and notched impact strength of thermoplastics while retaining their other positive properties. Thus, as described in DE-OS 33 29 765 (equivalent to U.S. Pat. No. 4,521,567), the impact strength modification of polymethyl methacrylate (PMMA) is increased by a factor of 5 compared to unmodified PMMA by a 30 wt. % elastomer fraction, but at the same time the Vicat temperature is reduced by 20° K., which is prohibitive for many applications, especially for injection molded parts subjected to severe thermal stresses.

The blends described in EP-A 370 345 and EP-A 370 346 of crosslinked silicone and acrylate rubbers grafted with styrene-acrylonitrile copolymers and styrene-acrylonitrile (SAN) copolymers show improved flow capabilities compared to SAN copolymers that are modified only with acrylate elastomers, but on the other hand they have no significantly increased notched impact strength.

EP-A 0 367 052 describes molding compositions of polyesters and a mixture of two grafted rubbers, an acrylate rubber and a butadiene grafted rubber, whose low-temperature notched impact strength rises continuously with an increase in the proportion of butadiene grafted rubber in the rubber blend. Of course, this is combined with a decrease of the modulus of elasticity.

SUMMARY OF THE INVENTION

One object of the present invention is to provide polymer blends, in the form of thermoplastic molding compositions, that show high notched impact strength and high impact strength while retaining the other positive properties of the pure blend components.

This and other objects which will become apparent from the following specification have been achieved by the polymer blends of the invention which contain two two-phase or multiphase polymers P1 and P2, each of which is made up of at least one optionally crosslinked toughening phase A1 and A2, respectively, with a glass transition temperature $T_g < 10°$ C. and a hard phase B1 and B2, respectively, at least partially covalently bonded to it. The hard phases B1 and B2 must differ in chemical structure, and even if they are not covalently bonded to the toughening phases, and must form polymer alloys when blended with one another, i.e., must be thermodynamically compatible. Excluded as components for B1 and B2 are polymers that contain monomer units from the group consisting of acrylonitrile, methacrylonitrile, maleic anhydride, and N-substituted maleimide, containing aromatic substituents.

The Toughness Phase A of the Polymers P

The high impact strength polymer blends of the invention are made up of two two-phase or multiphase polymers P1 and P2. P1 and P2 each contain (a) at least one optionally crosslinked toughening phase (i.e., elastomer) A1 and A2, respectively, with a glass transition temperature $Tg < 10°$ C., preferably $< -10°$ C., which is at least partially covalently bonded to (b) at least one thermoplastic hard phase (matrix polymer) B1 or B2, with a glass transition temperature $Tg > 30°$ C., preferably $> 50°$ C.

The toughening phases A1 and A2 are usually called rubbers or elastomers and by definition are polymers A with a glass transition temperature $Tg < 10°$ C., preferably $< -10°$ C. Tg is determined by the method of H. F. Mark et al., Encyclopedia of Polymer Science and Engineering, 2nd Ed., Vol. 7, Pages 531 to 544, J. Wiley & Sons, 1989. The polymers A are preferably chosen from the group of polyolefins, polydienes, polyacrylates, ethylene-vinyl acetate copolymers, and polysiloxanes.

The polyolefins are preferably homopolymers or copolymers of ethylene, propylene, or isobutylene (see Ullmann's Enzyklopedie der technischem Chemie, 4th Ed., Vol. 19, Pages 167 to 226, Verlag Chemie Weinheim, 1980; and Kirk-Othmer, Encyclopedia of Chemical Technology, 3rd Ed., Vol. 16, pp. 385 to 499, Wiley Interscience, 1981). In general, the average molecular weight (Mw) of the uncrosslinked polyolefins is in the range of $10^4$ to $10^6$ Daltons. Of particular interest are ethylene-propylene-diene (EPDM) copolymers (see Kirk-Othmer, Encyclopedia of Chemical Technology, 3rd Ed., Vol. 8, Pages 492–500, Vol. 7, Pages 687–693, J. Wiley; for preparation, see S. Cesca, J. Polym. Sci. Makromol., Rev., 19075, 10:1), whose average molecular weights (Mw) in general are in the range between $5 \cdot 10^4$ and $5 \cdot 10^5$ Daltons. The average molecular weights in Daltons or in g/mole can be determined using gel permeation chromatography or the light-scattering method. (see H. F. Mark et al., Encyclopedia of Polymer Science and Engineering, 2nd Ed., Vol. 10, pp. 1–10, J. Wiley & Sons, 1987). Trans-1,4-hexadiene, dicyclopentadiene, and ethylidene norbornene are preferably used as the diene component of EPDM copolymers. The glass transition temperatures Tg are generally between $-55°$ C. and $-30°$ C. (for sequential types). With ethylene contents of 45 to 60 wt. %, the EPDM copolymers are completely amorphous. With ethylene contents $>70$ wt. %, partially crystalline ethylene sequences appear with approximately 5 to 10 ethylene units in succession (sequential types). The proportion of unsaturated groups in the EPDM is about 2 to 30, preferably 5 to 15 double bonds per 1000 carbon atoms.

The preferred crosslinking of the EPDM toughening phase can be brought about by thermal radical formation on polymer chains followed by reaction of the radicals thus formed with the double bonds of other polymer molecules, thus forming covalent bonds between the polymer molecules. Furthermore, radicals can be produced on polymer chains by homolytic cleavage of atoms, particularly hydrogen atoms, from the polymer molecule. Peroxides such as t-butyl hydroperoxide, t-butyl peroctoate, benzoyl peroxide, or t-butyl perpivalate are particularly suitable for this purpose in amounts of 0.05 to 5 wt. % based on the EPDM polymer, in the same way they are used as polymerization initiators.

The use of known crosslinking monomers with two or more ethylenically unsaturated groups polymerizable by radicals is also possible, for example (meth)acrylic esters of di- and polyols, such as ethylene glycol dimethacrylate, or particularly allyl compounds such as triallyl cyanurate. They are used preferably in amounts of 0.1 to 5 wt. % based an the EPDM polymer. After the crosslinking, the EPDM elastomers are preferably in particulate form, and the diameter of these rubber particles is generally between 0.1 and 10 μm, preferably in the range between 0.2 to 5 μm. Particularly preferred are such rubber particles that have hard phase inclusions (see Ullmann, loc. cit., Vol. 13, Page 623, Kirk-Othmer, Encyclopedia of Chemical Technology, 3rd Ed., Vol. 1, Pages 442 to 455, Wiley Interscience, 1981).

In addition, the polymers A can be polydienes that are preferably made up of butadiene, 2-chlorobutadiene, or polyisoprene (see Ullmann, loc. cit., Vol. 13, Pages 595 to 635). The average molecular weights (Mw) of the uncrosslinked polydienes are in the range between $10^4$ and $10^5$ Daltons. Particularly preferred is polybutadiene that is crosslinked, as described above for the polyolefin EPDM, thermally, by peroxides, or with monomers that have two or more ethylenically unsaturated groups polymerizable by radicals. In another preferred embodiment, the covalent bonds between the polymer molecules are formed by reaction with elemental sulfur with the formation of sulfur bridges (see Ullmann, loc. cit., Vol. 13, Pages 595 to 635, Kirk-Othmer, Encyclopedia of Chemical Technology, Vol. 20, 3rd Ed., Pages 337 to 364, Wiley Interscience, 1981). The glass transition temperatures of the polybutadiene toughening phases are from $-85$ to $-75°$ C. and thus guarantee good low-temperature toughness of polymers containing polybutadiene (in this regard, see Kirk-Othmer, Encyclopedia of Chemical Technology, Vol. 8, Page 609, Wiley Interscience, New York, 1979).

Preferred polymers P containing polybutadiene are styrene-butadiene copolymers (SB according to DIN 7728) that contain between 5 and 50 wt. %, preferably between 10 and 25 wt. % butadiene (see Kirk-Othmer, Encyclopedia of Chemical Technology, Vol. 8, Pages 608 ff, Wiley Interscience, New York, 1979).

Polyacrylates whose monomer units provide a glass transition temperature Tg of the resulting homopolymer or copolymer of $< 10°$ C., preferably $< -10°$ C., can also be used for the polymers A. The glass transition temperature of the homopolymers or copolymers is known or can be determined by a known method (see J. Brandrup, E. H. Immergut, Polymer Handbook III; Pages 144 to 148, John Wiley, New York, 1975).

The polyacrylates are preferably prepared by polymerization in aqueous emulsion, optionally in suspension. Emulsion polymerization is especially preferred since polyacrylate elastomers with definite particle structure can be produced by this method (see H. Rauch-Puntigam, Th. Volker, Acryl- and Methacrylverbindungen, Pages 217 to 230, Springer-Verlag 1967). The latex particles thus produced, which have an outer shell of the polymer described below, contain the crosslinked polyacrylate or polymer A in their interior. Particularly preferred in this case are latex particles with a three-layer structure, or particles that also have a hard polymer core in the polyacrylate A which can also consist of polymer B.

Overall, these approximately spherical polyacrylate elastomers (with or without enclosed core) should have diameters of 0.1 to 3 μm, preferably 0.2 to 1 μm. The structure of such latex particles and the isolation of the polymer solid is described in U.S. Pat. No. 4,513,118 incorporated herein by reference.

It is suitable to carry out emulsion polymerization in the neutral or slightly acidic pH region, with the use of alkylsulfates or alkylsulfonate catalysts. It is also possible to use water-soluble azo compounds or organic peroxides as well as inorganic peroxides, such as potassium peroxydisulfate, or redox systems such as peroxydisulfate/bisulfite, as polymerization initiators. The emulsifier content should be about 0.1 to 5 wt. %, and the content of polymerization initiators about 0.001 to 1 wt. % based on the monomers. The polyacrylate elastomers are preferably made up of lower alkyl acrylates with 1 to 10 carbon atoms in the alkyl group, and preferably of ethyl acrylate, butyl acrylate, 2-ethylhexyl acrylate, or mixtures of these, and also alkoxy acrylates such as those described in U.S. Pat. No. 3,488,331 incorporated herein by reference. These polyacrylate elastomers usually also contain crosslinking monomers that have at least two ethylenically unsaturated groups which can be copolymerized by radicals, in proportions of 0.1 to 5 wt. % based on the monomers. Crosslinking monomers that are preferably used are (meth)acrylic esters of diols and polyols (such as ethylene glycol dimethacrylate, two polymerizable groups of different reactivity, or pentaerythritol tetraacrylate), aromatic compounds with two vinyl or allyl groups, allyl methacrylate as grafting crosslinking agent, or triallyl cyanurate.

Non-ionogenic water-soluble dispersion stabilizers are used primarily in the preparation of grafted toughness phase polymers A by suspension polymerization, as well as monomer-soluble organic peroxides or azo compounds as initiators.

Polysiloxanes can also be used as toughening phase polymers A. These known silicone rubbers usually have a polydimethylsiloxane chain modified by special substituents, and have glass transition temperatures between −120° C. and −80° C. The types of polysiloxanes crosslinking at room temperature, are terminally functionalized and have average molecular weights (Mw) between $10^4$ and $10^5$ Daltons. So-called "hot-vulcanizing" types of polysiloxane, preferably based on polydimethoxysiloxane, can be crosslinked with rapidly dissociating diaryl peroxides at elevated temperature, for example at 150° C. (see Winnacker-Kuchler, Volume 6, Pages 842 to 849, 4th Edition, Carl Hanser, Munich 1982; Kirk-Othmer, loc. cit., Vol. 20, Pages 943 to 953).

When ethylene-vinyl acetate (EVA) copolymers are used as toughening phase A the vinyl acetate content is usually in the range between 40 and 75 wt. % based on the monomers, preferably between 40 and 50 wt. %. The average molecular weights (Mw) in this case are between $3 \cdot 10^4$ and $4 \cdot 10^5$ Daltons. The EVA copolymers are crosslinked with peroxides such as dicumyl peroxide, or polyfunctional ethylenically unsaturated monomers that can be copolymerized by radicals, such as triallyl cyanurate, for example (see Winnacker-Kuchler loc. cit., Volume 6, Pages 570, 571).

The crosslinked toughening phases A based on polysiloxane or EVA copolymers have particle sizes in the range between 0.1 and 5 μm and in a preferred embodiment, they contain hardness phase inclusions.

The Hardness Phases B of the Polymers P

A portion of the hardness phases B (preferably at least 5 wt. % ) are covalently bonded to the particular toughness phases A by grafting, more preferably to an extent of more than 15 wt. % based on P. The polymer blends containing two polymers P1 and P2 are characterized by the fact that the hardness phase polymers B1 and B2, if they are not covalently bonded to the toughness phase polymers A1 and A2, form compatible polymer blends with one another which exhibit compatibility, i.e., Lower Critical Solution Temperature (LCST) separation temperatures above 100° C. at any composition ratio of B1:B2. Separation temperature in the context of this invention means the temperature at which the phase transition from homogeneous to heterogeneous is visually recognizable by turbidity in the transparent polymer alloy. (see Kirk-Othmer, Encyclopedia of Chemical Technology, 3rd Ed., Vol. 18, pages 457 ff, Wiley Interscience, New York, 1979 or Brandrup, Immergut, Polymer Handbook, 2nd Ed., III, Pages 211 to 213). The LCST behavior (see D. R. Paul, Polymer Blends and Mixtures, Pages 1 to 3, Martinus Nijhoff Publishers, Dordrecht, Boston Lancaster, 1985) is identified by determining the cloud point of the transparent polymer alloys as a function of temperature on a Kofler hotplate (Chem.-Ing. Techn. 1950, Page 289). These polymer alloys can be prepared thermo-mechanically by mixing the melts in an extruder, on a roller kneader, in a Brabender kneader, or in any unit with intensive mixing (see Kirk-Othmer, Encyclopedia of Chemical Technology, 3rd Ed., Vol. 18, Pages 443 ff, Wiley Interscience, New York, 1979). The blend components can also be dissolved in a common solvent and subjected to intensive mixing. The resulting solution can be cast and dried to form a transparent film, or coagulated and lyophilized (see Kirk-Othmer, loc. cit., Vol. 18, Page 444).

The hardness phase polymer B1 is a polymer selected from the group of polyvinyl chloride, polystyrene, poly-α-methylstyrene, polycarbonate, polyalkylene terephthalate, or chlorinated rubber. The hardness phase B2 is a polymer of Formula I:

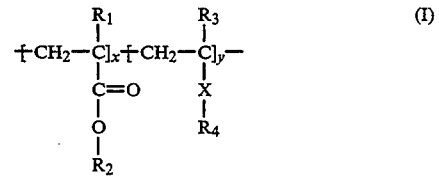

where:
R₁ and R₃ stand for hydrogen or methyl,
R₂ stands for alkyl with 1 to 6 carbon atoms,
—X— stands for —C(O)O—, —O—C(O)— or —C(O)—NH—, and
R₄ stands for an optionally substituted cycloalkyl group with 5 to 8 carbon atoms or for an optionally substituted aryl group with 6 to 12 carbon atoms, and
x and y add up to 100 wt. %, optionally with other copolymerizable monomers* present in amounts of 0 to 20 wt. %, provided that y is in the range between 0 and 100 wt. %.

*) Other copolymerizable monomers can be i.e.: styrene, α-methylstyrene, acrylic or mothacrylic acid, acrylates or methacrylates with alkyl ester groups containing more than 6 carbon atoms.

Examples of these monomer units of the general form $CH_2=CR_3$—X—$R_4$ are: phenyl (meth)acrylate, cyclohexyl (meth) acrylate, cyclopentyl (meth) acrylate, 4-methoxyphenyl (meth) acrylate, cyclohexylmethacrylamide, and/or phenylmethacrylamide.

In a preferred embodiment of the invention, the hardness phase polymer B1 is polystyrene or poly-α-methylstyrene, while the hardness phase polymer B2 is made up of polymers of Formula II:

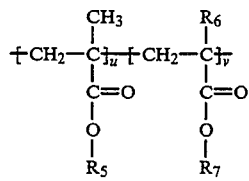

where:

$R_5$ stands for methyl or ethyl $R_6$ stands for hydrogen or methyl, and $R_7$ stands for an optionally substituted cycloalkyl group with 5 to 8 carbon atoms, or an optionally branched alkyl group with 4 to 8 carbon atoms, or a nonaromatic heterocyclic group containing 4 to 12 ring atoms and at least 2 heteroatoms X, where X is O, S, or NH, with the heteroatoms not being adjacent to one another, and u and v add up to 100 wt. %, optionally with other copolymerizable monomers present in amounts of 0 to 20 wt. %, provided that v is in the a range from 5 to 95 wt. %.

An example of the monomer units with heterocyclic substituents is 2,2-dimethyl-1,3-dioxolan-4-yl-methyl methacrylate.

Excluded as blend components B1, B2, B'3, and B4 are: (co)polymers that contain acrylonitrile, methacrylonitrile, maleic anhydride or N-substituted maleimide monomer units containing aromatic substituents. Blends of acrylonitrile-butadiene-styrene terpolymers, EPDM elastomers with grafted branches of styrene-acrylonitrile copolymers, and butyl acrylate-styrene elastomers with polymethyl methacrylate grafted branches are described in JP 59 62 658.

The following may be mentioned as examples of polymer alloys from B1 and B2 (this also applies to polymer alloys from B1 and B'3, B1 and B4, B2 and B'3, B2 and B4, and B'3 and B4):

| | |
|---|---|
| 1. Bisphenol-A-polycarbonate | Copolymer of methyl methacrylate and substituted methacrylamide (US 4,749,749) |
| 2. Bisphenol-A-polycarbonate | Copolymer of methyl methacrylate and cyclohexylmaleimide (US 4,950,716) |
| 3. Bisphenol-A-polycarbonate | Copolymer of methyl methacrylate and cycloalkyl(aryl) methacrylate (US 4,906,696; US 4,906,699) |
| 4. Polystyrene | Copolymer of alkyl methacrylate and cycloalkyl (meth)acrylate (US 4,898,912; US 4,906,699) |
| 5. Polystyrene | Copolymer of alkyl methacrylate and methacrylate with heterocyclic ester group (US 4,985,504) |
| 6. Poly-α-methylstyrene | Copolymer of alkyl methacrylate and cycloalkyl (meth)acrylate (US 4,849,479; US 4,906,699) |
| 7. Polyalkylene terephthalate | Copolymer of alkyl methacrylate and aryl (meth)acrylate (WO 9 111 490) |
| 8. Polyvinyl chloride | Copolymer of methyl methacrylate, alkylmethacrylate, and/or cycloalkyl (meth)acrylate (US 4,906,699) |
| 9. Copolymer of styrene alkyl acrylate | Polyalkyl methacrylate (EP-A 0 359 185) |

The U.S. patents noted above are incorporated herein by reference.

If another thermoplastic polymer B'3 and/or another two-phase or multiphase polymer P4, with at least one optionally crosslinked toughening phase elastomer A4 and at least one thermoplastic hardness phase polymer B4 at least partly bonded to A4, is present in addition to the polymers P1 and P2 with the hardness phase polymers B1 and B2, then ternary or quaternary polymer alloys with separation temperatures (LCST) above 100° C. must be formed by B1, B2 and B'3; B1, B2 and B4; and B1, B2, B'3 and B4.

Examples of these are:

| B1 | B2 | B'3 (B4) |
|---|---|---|
| Bisphenol-A-polycarbonate | Polystyrene | Copolymer of methyl methacrylate and cycloalkyl methacrylate (US 4,898,912, US 4,906,699) |
| Bisphenol-A-polycarbonate | Polyalkylene terephthalate | Copolymer of methyl methacrylate and aryl (meth)acrylate (US 4,906,696, WO 9 111 490) |

Examples of thermoplastic polymers B'3 include:

a) Polycarbonates (according to DIN 7728 T1), such as polycondensation products of 4,4'dihydroxydiphenylalkanes (bisphenols) with carbonic acid. Their average molecular weight (Mw) is usually in the range between $2 \cdot 10^4$ and $6 \cdot 10^4$ Daltons (see Kirk-Othmer, Encyclopedia of Chemical Technology, 3rd Ed., Vol. 61 Pages 106 to 116; H. Schnell, Chemistry & Physics of Polycarbonates, J. Wiley, 1982).

b) Polyalkylene terephthalates such as polyethylene terephthalate or polybutylene terephthalate, whose average molecular weight (Mw) is usually between $10^4$ and $2 \cdot 10^5$ Daltons (see Kirk-Othmer, Encyclopedia of Chemical Technology, 3rd Ed., Vol. 18, Pages 549 to 594, J. Wiley 1982).

c) Polystyrene (according to DIN 7741 E) having an average molecular weight (Mw) preferably between $10^5$ and $5 \cdot 10^5$ Daltons (see Kirk-Othmer, loc. cit., Vol. 21, Pages 801 ff).

d) Polyvinyl chloride (according to DIN 7748 E and 7749 E) with an average molecular weight (Mw) between $1.5 \cdot 10^4$ and $10^5$ Daltons (see Kirk-Othmer, loc. cit., Vol. 23, Pages 886 to 936).

Bonding of the Toughening Phase Elastomers A and the Hardness Phase Polymers B in the Polymers P (grafting of B to A)

The term "grafting" as used herein means the process by which one or more monomers is or are polymerized in the presence of a polymer or copolymer, which is or are then bonded covalently to the carbon skeleton of the presented polymer as new polymer branches.

Crosslinked EPDM toughening phase elastomers A are typically grafted in an organic solvent in the presence of one or more types of monomers and a polymerization initiator. The reaction is suitably controlled so that a high grafting yield is obtained, i.e., the largest possible fraction of the grafted branch (co)polymer B are bonded covalently to the EPDM elastomer A. It is also suitable for the grafted polymer branches B to have an average molecular weight (Mw) between $10^4$ and $5 \cdot 10^5$, preferably between $2 \cdot 10^4$ and $10^5$. For example, when grafting EPDM at 120° C. in butyl acetate as solvent, the polymerization of the monomers to the hardness phase polymer B is carried out, and is then carried to completion with the addition of other monomers, a graft crosslinker with two or more ethylenically unsaturated groups polymerizable by radicals, for example allyl methacrylate or triallyl cyanurate, as well as a polymerization initiator such as dibenzoyl peroxide or t-butyl peroctoate. The polymerization is suitably carried out in the presence of polymerization regulators such as mercaptans.

The grafted EPDM rubber (polymer P) is obtained, for example, by precipitation followed by drying, or by degassing in an extruder. The preparation of the diene rubber grafting substrate and of the grafting polymers is known and is preferably carried out in a two-step process (see EP-A 0 367 052). A detailed description of the preparation of ABS polymers with crosslinked diene rubber elastomer phases, and the grafting of styrene-acrylonitrile copolymer as the thermoplastic hardness phase by emulsion polymerization or bulk polymerization is found in Ullmann's Enzyklopadie der technischen Chemie (Vol. 19, Pages 280 to 286, 1981, Verlag Chemie, Weinheim) or in Kirk-Othmer, Encyclopedia of Chemical Technology, 3rd Ed., Vol. 1, Pages 442-455, Wiley Interscience, 1981). The grafted diene rubber (polymer P) is isolated, for example, by precipitation followed by drying of the wet powder, or with a degassing extruder.

In the case of crosslinked toughening phase elastomer A based on polyacrylate, the hardness phases B are preferably grafted on in the second step of a two-step emulsion polymerization. Latex particles with a core-shell structure are formed, with both the grafted and ungrafted fractions of the hardness phase (co)polymer B showing thermoplastic behavior. The structure of such latex particles and the isolation of the polymer solid is described in U.S. Pat. No. 4,513,118, incorporated herein by reference. The same polymerization initiators and emulsifiers are generally used in the grafting of the hardness phase B as in the polymerization of the toughness phase A. The grafted acrylate latex particles (polymer P) are preferably obtained by precipitation, spray drying, freeze coagulation, or by squeezing in an extruder.

If the toughening phase elastomers A consist mostly of polysiloxanes or ethylene-vinyl acetate copolymers, the grafting of the hardness phase polymer B is preferably done in emulsion or in suspension. In a preferred embodiment, the toughening phase A is first crosslinked with peroxide polymerization initiators during and/or after the grafting of the hardness phase B. The grafted polysiloxanes or ethylene-vinyl acetate copolymers (polymer P) are processed similarly to the acrylate latex particles by precipitation, spray drying, freeze coagulation, or squeezing with an extruder.

Preparation of the Polymer Blends

The polymer blends can be prepared by various known procedures. For example, they are prepared by intensive mechanical mixing of the blend components P1 and P2, or P1, P2 and B'3 and/or P4 in the melt. In the same way, the polymer blend can be produced by solvent precipitation. There are no limits to the method of blending. In a preferred embodiment, the blend components are first mixed intensively (see Ullmann's Encyclopedia of Industrial Chemistry, Vol. B2, Pages 27/1 27/16, 5th Ed., Verlag Chemie, Weinheim, 1988) as solids, for example in the form of a powder, bead polymer, or preferably a granulate, using slow mixing units, such as drum mixers, screw mixers, double-chamber mixers, or plowshare mixers. The thermoplastic processing then follows by homogeneous blending in the melt using heated mixing units at a suitable temperature, for example 150° C. to about 300° C., in kneaders or preferably in extruders, for example single-screw or multiple-screw extruders, or optionally in extruders with oscillating screws and shearing pins (for example, in a BUSSCO kneader). Granulates with uniform grains (cubic shape, round grain) with a grain size between 2 and 3 mm are generally prepared by this method.

Surprisingly, the high impact strength polymer blends pursuant to the invention in all ratios P1:P2, P1:P2:B'3, P1:P2:P4 and Pi:P2:B'3:P4 have higher notched impact strengths than the pure blend components P1, P2, B'3, or P4.

Preferred blending ratios are:
P1 to P2:
99-1 wt. % to 1-99 wt. %, preferably 95-5 wt. % to 5-95 wt. %, and more preferably 85-15 wt. % to 15-85 wt. %.

The proportion of B'3 is usually between 0 and 50 wt. %. The proportion of P4 can likewise be between 0 and 50 wt. %.

Distinctly less reduction of dimensional stability under heat is associated with this improvement, compared to plastics that are processed with known impact strength-modifying additives. Thus, polymer blends of the components P1 and P2 can be used advantageously for the impact strength modification of thermoplastics B'3 according to the invention.

The polymer blends of the invention are preferably used as injection molding or extrusion compositions for shaped parts under high mechanical stress, for example cases, shock absorbers, or load-bearing equipment.

Other features of the invention will become apparent in the course of the following descriptions of exemplary embodiments which are given for illustration of the invention and are not intended to be limiting thereof.

The impact strength (SZ) is determined according to ISO 179, and the notched impact strength (KSZ) according to ISO 180. The Vicat softening temperature (VST) is determined by the method of DIN 53 460.

EXAMPLES

Example 1

Synthesis of an MMA-cyclohexyl methacrylate copolymer with EPDM as toughening phase (polymer P'1)

This graft polymer is prepared by the method of DE-OS 37 199.4.

200 g EPDM (product EPSYN ® 55 from the Copolymer Co.) was used as a 20 wt. % solution in butyl acetate. Added to this with stirring at 120° C. over a period of 2 hours was a mixture of:

260 g methyl methacrylate (MMA)
120 g cyclohexyl methacrylate
20 g cyclohexyl acrylate
6 g t-butyl peroctoate
600 g butyl acetate The mixture was then stirred for 15 minutes, cooled to 80° C., a mixture of 10 g triallyl cyanurate, 10 g MMA, and 4 g t-butyl peroctoate was added, and the mixture was stirred for 2 hours at 80° C. followed by stirring for 2 hours at 90° C. After cooling, the polymer was precipitated in methanol. A graft polymer with the following composition was formed:

66 wt. % copolymer of MMA, cyclohexyl acrylate/-methacrylate, and
33 wt. % EPDM.

Example 2

75 parts by weight of the polymer P'1 from Example 1 was blended with 25 parts by weight of a polystyrene-polybutadiene block copolymer (STYROLUXE® KR 2682; polymer P'2). Test specimens were injection molded from this mixture. A tough, white test specimen was obtained, from which the following properties were determined:

VST (as obtained, Process B): 53° C.
Charpy impact strength (23° C.) ISO 179: 41.4 KJ/m$^2$
Izod notched impact strength (23° C.) Iso 180: 3.2 KJ/m$^2$.

Example 3

50 parts by weight of polymer P'1 from Example 1 was blended with 50 parts by weight of STYROLUXE® KR 2682 (polymer P'2). Test specimens were injection molded from this mixture. A tough, white test specimen was obtained, from which the following properties were determined:

VST (as obtained, Process B): 57° C.
Charpy impact strength (23° C.) ISO 179: no failure
Izod notched impact strength (23° C.) Iso 180: 6.1 KJ/m$^2$.

Example 4

The procedure of Examples 2 and 3 was followed, but the following blend ratio was chosen:

25 parts by weight polymer P'1 from Example 1
75 parts by weight STYROLUXE® KR 2682 (P'2).

A high impact strength, white molding composition was obtained, from which the following properties were determined:

VST (as obtained, Process B): 60° C.
Charpy impact strength (23° C.) ISO 179: no failure
Izod notched impact strength (23° C.) ISO 180: T 37.2 KJ/m$^2$.

Example 5

When polymer P'2 (polystyrene-butadiene block copolymer) was injection molded alone, test specimens were obtained that were inferior to the blend (Examples 2–4), particularly in notched impact strength. The following properties were obtained:

Charpy impact strength (23° C.) ISO 179: no failure
Izod notched impact strength (23° C.) ISO 180: 1.7 KJ/m$^2$.

In the same way, polymer P'1 alone was distinctly inferior to the blends of Examples 2-4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high impact strength polymer blend of structurally different polymers P1 and P2, comprising:
    (1) 50–99 parts by wt. of a two-phase or multiphase polymer P1 having at least one elastomer A1, A1 having a glass transition temperature Tg<10° C., a portion of A1 being covalently bonded to at least one thermoplastic matrix polymer B1, B1 having a glass transition temperature Tg>30° C.; and
    (2) 1–50 parts by wt. of a two-phase or multiphase polymer P2 having at least one elastomer A2, A2 having a glass transition temperature Tg<10° C., a portion of A2 being covalently bonded to at least one thermoplastic matrix polymer B2, B2 having a glass transition temperature Tg>30° C., wherein
    a) polymer B1 is polystyrene or poly-α-methylstyrene, and
    b) polymer B2 is a polymer of formula I:

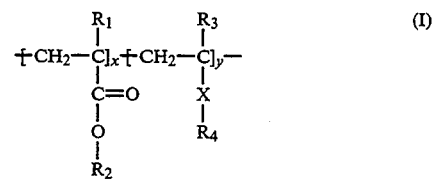

wherein:
    $R_1$ and $R_3$ are hydrogen or methyl,
    $R_2$ is alkyl having 1 to 6 carbon atoms,
    —X— is —C(O)—O—, —O—C(O)— or —C(O)—NH—,
    $R_4$ is a cycloalkyl group with 5 to 8 carbon atoms,
    optionally with other monomers present in amounts of up to 20 wt. % based on the monomers of formula (I), y is in the range between 5 and 100 wt. % and x is in the range between 0 and 95 wt %,
    c) blends of polymers B1 and B2 have separation temperatures LCST above 100° C.,
    d) the polymers B1 and B2 contain no acrylonitrile, methacrylonitrile, maleic anhydride, or N-substituted maleimide monomer units containing aromatic substituents, and
    e) elastomer A1 is structurally different from elastomer A2.

2. The polymer blend of claim 1, further comprising:
    e) a single-phase thermoplastic polymer B'3 in an amount up to 50 wt. %, where the amounts of P1, P2, and B'3 equal 100 wt. %, and wherein
    f) blends of polymers B1 with B'3 and B2 with B'3 have separation temperatures LCST above 100° C., and
    g) B'3 contains no acrylonitrile, methacrylonitrile, maleic anhydride, or N-substituted maleimide monomer units containing aromatic substituents.

3. The polymer blend of claim 2, further comprising:
    h) a two-phase or multiphase polymer P4 having at least one optionally crosslinked elastomer A4, A4 having a glass transition temperature Tg<10° C., a portion of A4 being covalently bonded to at least one thermoplastic matrix polymer B4, B4 having a glass transition temperature Tg>30° C. in an amount up to 50 wt. %, where the amounts of P1, P2, B'3, and P4 equal 100 wt. %, and i) blends of polymers B1 with B4 and B2 with B4, as well as mixtures of B4 and B'3, have separation temperatures LCST above 100° C., and k) B4 contains no acrylonitrile, methacrylonitrile, maleic anhydride, or N-substituted maleimide monomer units containing aromatic substituents.

4. The polymer blend of claim 1, wherein said elastomer A1, said elastomer A2 or both have a glass transition temperature Tg<−10° C.

5. The polymer blend of claim 1, wherein elastomer A1 and elastomer A2 are selected from the group consisting of polyolefins, polydienes, polyacrylates, ethylene-vinyl acetate copolymers and polysiloxanes.

6. The polymer blend of claim 1, wherein said elastomer A1, elastomer A2 or both are particulate elastomers having a particle size between 0.1–10 microns.

7. The polymer blend of claim 6, wherein A1 or A2 is a particulate ethylene-propylene-diene copolymer having a particle size between 0.2–5 microns.

8. The polymer blend of claim 6, wherein A1 or A2 is a particulate polyacrylate having a particle size diameter of 0.1–3 microns.

9. The polymer blend of claim 6, wherein A1 or A2 is a particulate polysiloxane or ethylene-vinyl acetate copolymer having a particle size between 0.1–5 microns.

10. The polymer blend of claim 6, wherein said elastomer A1 or A2 has a core/shell particulate structure.

11. The polymer blend of claim 1, wherein at least 5 wt. % of polymer B1 is covalently bonded to elastomer A1 or at least 5 wt. % of polymer B2 is covalently bonded to elastomer A2.

12. The polymer blend of claim 1, wherein at least 15 wt. % of polymer B1 is covalently bonded to elastomer A1, or at least 15 wt. % of polymer B2 is covalently bonded to elastomer A2.

13. A shaped polymer article comprising the polymer blend of claim 1.

* * * * *